United States Patent
Sundet et al.

[11] Patent Number: 6,059,254
[45] Date of Patent: *May 9, 2000

[54] PROCESS INSTRUMENT MOUNT

[75] Inventors: Paul C. Sundet, Plymouth; William B. Krueger, Bloomington, both of Minn.

[73] Assignee: Rosemount Inc., Eden Prairie, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/826,273

[22] Filed: Mar. 27, 1997

[51] Int. Cl.[7] ............................................. F16M 1/00
[52] U.S. Cl. ................................. 248/678; 248/637
[58] Field of Search .................... 248/678, 637, 248/676, 311.2, 346.01, 346.5, 314, 346.11

[56] References Cited

U.S. PATENT DOCUMENTS

| | | | |
|---|---|---|---|
| 2,999,385 | 9/1961 | Wolfe | 73/398 |
| 3,140,613 | 7/1964 | Hasegawa | 73/407 |
| 3,749,339 | 7/1973 | Avedissian | 248/550 |
| 4,006,640 | 2/1977 | Gealt | 73/393 |
| 4,073,191 | 2/1978 | Saigusa | 73/706 |
| 4,168,517 | 9/1979 | Lee | 361/283 |
| 4,190,782 | 2/1980 | Guess | 310/324 |
| 4,388,833 | 6/1983 | Kuwayama | 73/718 |
| 4,690,004 | 9/1987 | Tavis | 73/862.64 |
| 4,800,758 | 1/1989 | Knecht et al. | 73/727 |
| 4,844,274 | 7/1989 | Sterk | 220/3 |
| 4,852,466 | 8/1989 | Freeman et al. | 92/104 |
| 4,875,368 | 10/1989 | Delatorre | 73/152.51 |
| 4,905,575 | 3/1990 | Knecht et al. | 92/103 SD |
| 4,917,581 | 4/1990 | Richardson, Jr. et al. | 417/363 |
| 5,094,109 | 3/1992 | Dean et al. | 73/718 |
| 5,097,172 | 3/1992 | Becka | 310/348 |
| 5,265,471 | 11/1993 | Kawauchi et al. | 73/493 |

FOREIGN PATENT DOCUMENTS

| | | |
|---|---|---|
| 0 242 813 | 10/1987 | European Pat. Off. . |
| 2 431 650 | 2/1980 | France . |
| 2 156 998 | 10/1985 | United Kingdom . |

OTHER PUBLICATIONS

Catalog No. DS 096: "Diaphragm Seals—Inovations by PI Components", PI Components Corporation, 1995.

"Model 2090P Absolute and Gage Pressure Transmitter", Rosemount Inc., PDS 4699A00, English, Jun. 1995, p. 5.

Product Manual: "Models 2088, 2090P, and 2090F Pressure Transmitters", Rosemount Inc., 00809–0100–4690, English Rev. B1, 1996.

"Electronic Pressure Transmitter", Paper Machine Components, Inc., 1990.

"Model 2090P Absolute and Gage Pressure Transmitter", Rosemount Inc., 00813–0100–4699, English, May 1996, pp. 1–5.

Manual Supplement MAN 4016–1, "Sanitary Tank Spud Welding Procedure", Rosemount Inc., Sep. 1993.

Model 1199 Filled Systems—For Use with Model 3051C, 1151, and 2088 Transmitters, Rosemount Inc., 00813–0100–4016, English, Dec. 1996, pp. 1–45.

*Primary Examiner*—Anita M. King
*Attorney, Agent, or Firm*—Westman, Champlin & Kelly, PA

[57] ABSTRACT

A process instrument mount includes an outer wall and an inner wall. The outer wall is separated from the inner wall by a space. The mount has a first end and a second end, and a hole extends from the first end to the second end. The inner wall surrounds the hole, and has a threaded region to receive a process instrument from the first end. The inner wall also has a flange proximate the second end to sealingly mate with the process instrument. In one embodiment the inner and outer walls are portions of a unitary metal block, and the space separating them comprises a groove formed in the metal. In another embodiment the inner and outer walls are separate parts joined together at the second end and spaced apart between the first and second ends.

19 Claims, 6 Drawing Sheets

PROCESS INSTRUMENT MOUNT

BACKGROUND OF THE INVENTION

The present invention relates generally to transmitters that measure fluid properties such as pressure in a process container. More specifically, the invention relates to a technique for mounting such transmitters or related process control equipment, e.g. a pressure diaphragm module known as a "remote seal" that connects to such a transmitter by a capillary line. The term "process instrument" as used herein includes all such transmitters and related process control equipment.

In FIG. 1, a PRIOR ART process instrument mount 10 is shown installed on a process container 12 such as a pipe, tank, or other (typically curved) vessel. The mount 10 is welded to the process container and is also threaded to receive a process instrument such as pressure transmitter 14. Once welded into position on the process container 12, the transmitter mount 10 becomes a permanent fixture to hold transmitter 14 in position on the container. Mount 10 has a base 10a and a flange 16 proximate such base. A gasket 18, sandwiched between flange 16 and a transmitter base 14a, is sized to mate with, or superimpose onto, the flange and seals the opening of the container to prevent leakage of process fluid from the container. Gasket 18 can be type Gylon No. 3510 available from Garlock Inc., Palmyra, N.Y. Transmitter 14 can be model 2090P available from Rosemount Inc., Eden Prairie, Minn.

Installation of mount 10 begins after evacuating process fluid from container 12. First, a hole is cut in the wall of container 12 at a selected installation position. Next, mount 10 is positioned in the hole such that base 10a is flush with an inner surface 12a (see FIG. 2) of container 12. A heat sink, screwed into mount 10 in place of transmitter 14, an be used by the installer to maneuver mount 10. A series of tack welds are then applied o the outer surface of mount 10 to temporarily hold the mount in position. If the temporary mount position is acceptable, a series of full welds are then applied. The full welds form a continuous weld seam or line (also known as a weld outlet interface line) along a circumference of the mount. After cooling, the heat sink is removed and the mount is ready to receive a gasket and process instrument.

FIG. 2 depicts a side view of a weld line 20 for a relatively small diameter process container 12. The plane of view of FIG. 2 is perpendicular to the plane of view of FIG. 1. Note that the weld line extends over an appreciable length L of mount 10. The smaller the diameter of container 12, the greater its curvature at the mount position, and the greater the extent L of the weld line along the mount.

A drawback of PRIOR ART mount 10 is its susceptibility to warpage during the welding operation, particularly for relatively small diameter containers 12. The intense heat produced during the process and the uneven distribution of loading along the length of the mount tends to distort the inner wall containing the threads. This distortion can prevent removal of the threaded heat sink used during welding, or can prevent a process instrument from being inserted into the mount. The mount 10 must then be removed and replaced, or rethreaded, causing delays and increased installation costs.

Therefore, there is a need for a transmitter mount that resists weld-induced warpage.

BRIEF SUMMARY OF THE INVENTION

According to one aspect of the present invention, a process instrument mount for process containers includes an outer wall and an inner wall, the outer and inner walls being paced apart from each other. The inner wall has a threaded region to receive a process instrument and the outer wall is capable of being welded to the process container. In one embodiment the mount is of unitary construction, and has a groove separating the inner wall from the outer wall. In another embodiment the inner wall and the outer wall are separate parts bonded together, e.g. by a weld joint.

For convenience, items in the figures having the same reference symbol are the same or serve the same or a similar function.

DETAILED DESCRIPTION OF THE PREFERRED EMBODIMENTS

Figure 1:
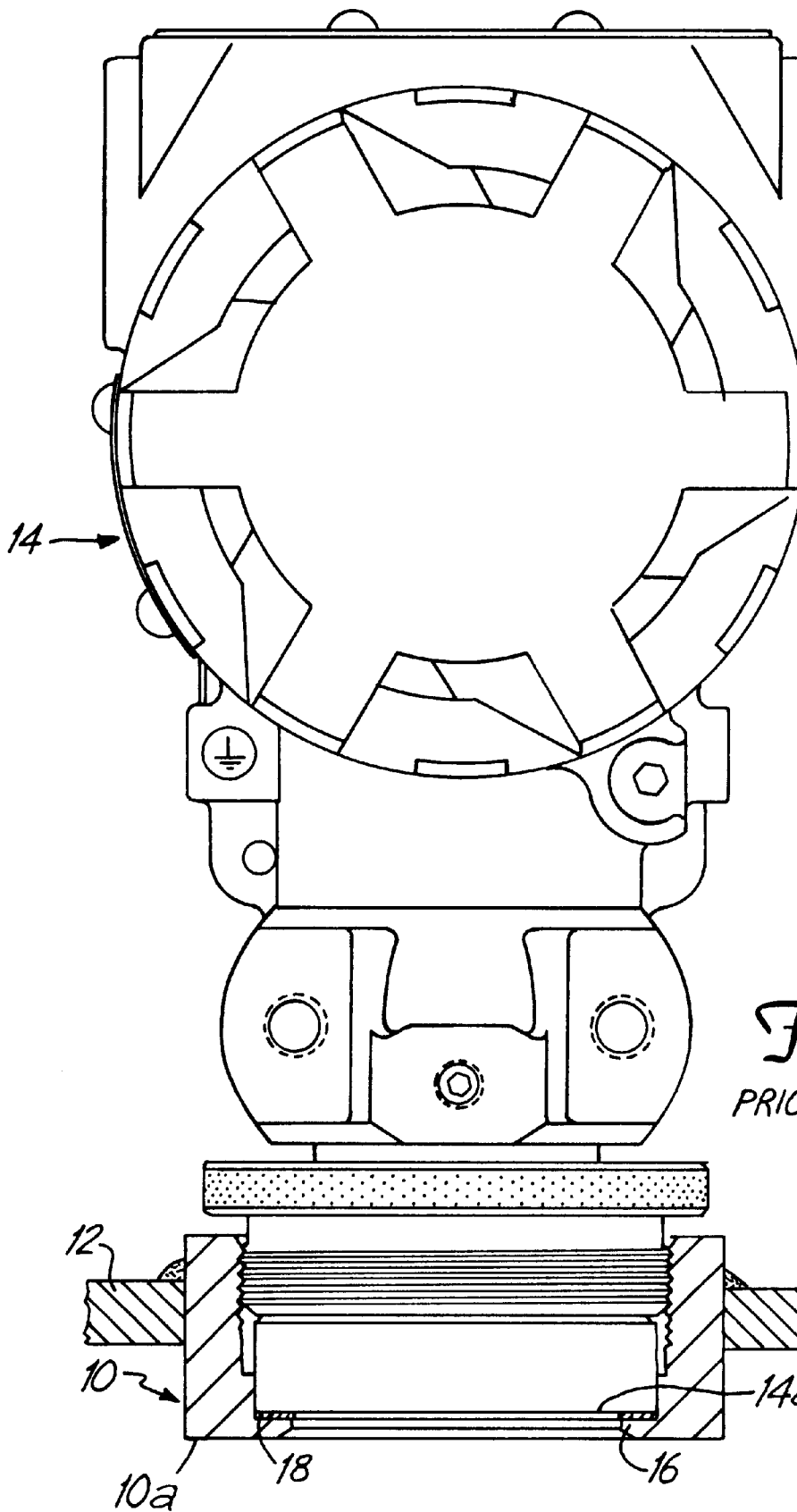
FIG. 1 shows a frontal-side view of a PRIOR ART process instrument mount.
Figure 2:
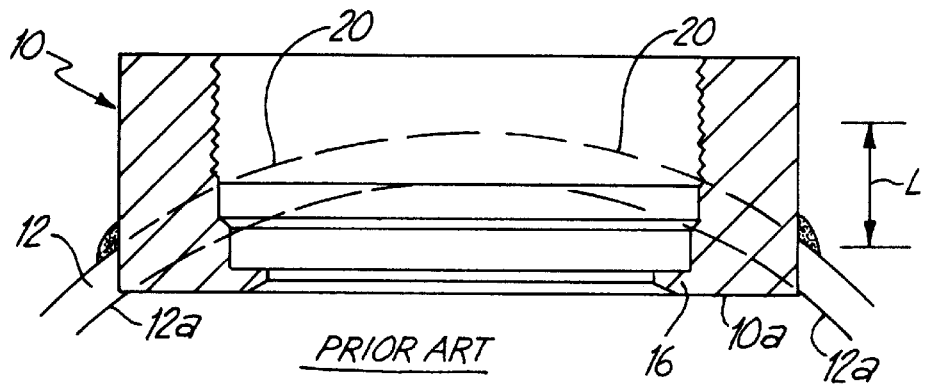
FIG. 2 depicts a weld line associated with the PRIOR ART mount of FIG. 1.
Figure 3:
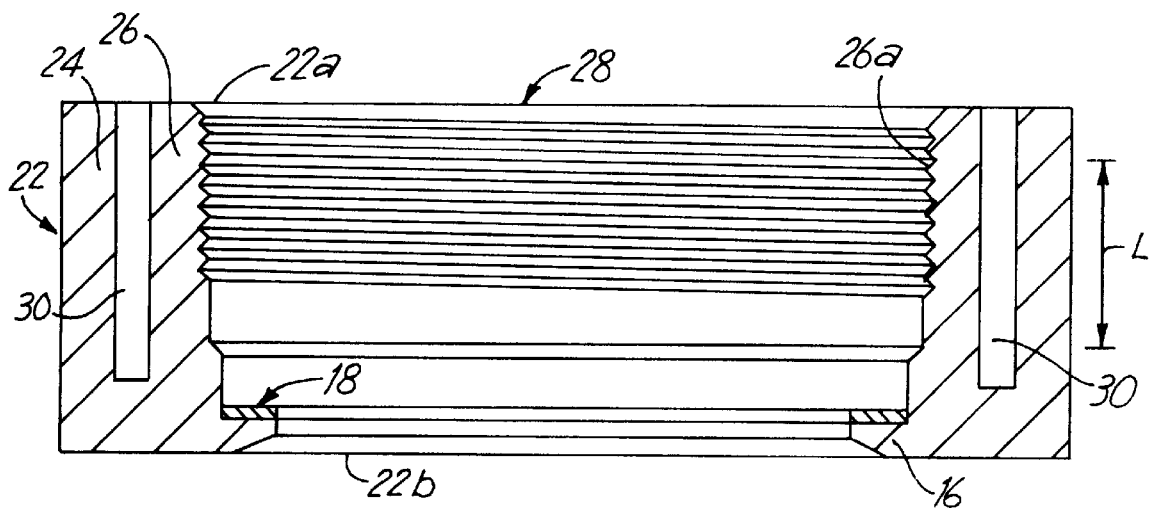
FIG. 3 shows a cross-sectional view of a preferred process instrument mount according to one aspect of the invention.

In FIG. 3, a preferred process instrument mount 22 has an outer wall 24 and an inner wall 26. A hole or bore 28 extends from a first end 22a to a second end 22b of mount 22. The inner wall 26 surrounds the hole 28 and includes a threaded region 26a adapted to receive a process instrument such as a remote seal or the transmitter 14 from the end 22a. Wall 26 also includes flange 16 proximate end 22b to sealingly mate with the base 14a of such transmitter or seal using gasket 18. Outer wall 24 can be welded to a process container at a selected installation position as described above. When transmitter 14 is installed in mount 22, process fluid contacts transmitter base 14a through hole 28, and transmitter 14 provides an output indicative of the pressure of such fluid.

According to an aspect of the invention, a space 30 separates the walls 24,26. In the embodiment of FIG. 3, walls 24,26 comprise portions of a unitary piece of metal making up mount 22, and space 30 is a groove encircling hole 28 and at least partially separating walls 24,26. The groove substantially stress-isolates inner wall 26 from weld-induced stresses exerted on outer wall 24 along the weld length L. The space also reduces thermal conductivity between walls 24,26, keeping the threaded region of wall 26 at a lower temperature than that of the prior art during welding of wall 24.

In a preferred embodiment mount 22 has an overall length from end 22a to end 22b of 0.820 inches (about 20.83 mm), the same as prior art mount 10. The outer dimension (diameter) of wall or ring 24 is kept as small as possible to minimize the hole size required to bore into the process container. However, the thickness of wall 24 should be sufficient to allow for adequate weld penetration without burn-through. Likewise, the thickness of inner wall 26 should be sufficient to rigidly and reliably hold a process instrument in place. If the groove is cut with a standard cutting tool, then it will have a minimum width dictated by the width of the cutting tool. The cutting tool width in turn is a function of the desired depth of the groove, with deeper grooves requiring wider tools. In the preferred embodiment the groove depth is approximately 0.650 inches (16.51 mm), which is sufficiently deep so that space 30 extends along the entire weld length L for maximum stress isolation. In such case the groove width is approx. 0.083 inches (2.11 mm) wide, and the overall diameter of outer wall 24 is 2.370 inches (about 60.20 mm). This compares to an overall diameter of about 2.120 inches (about 53.85 mm) for prior art mount 10.

Figure 4A:
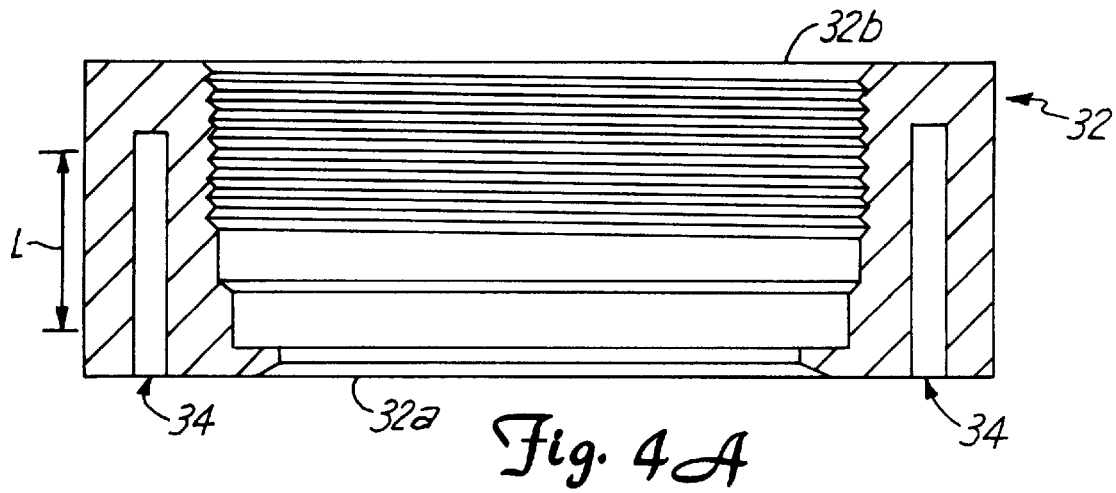
FIGS. 4a–4d show alternative mounts according to an aspect of the invention.
Figure 4B:
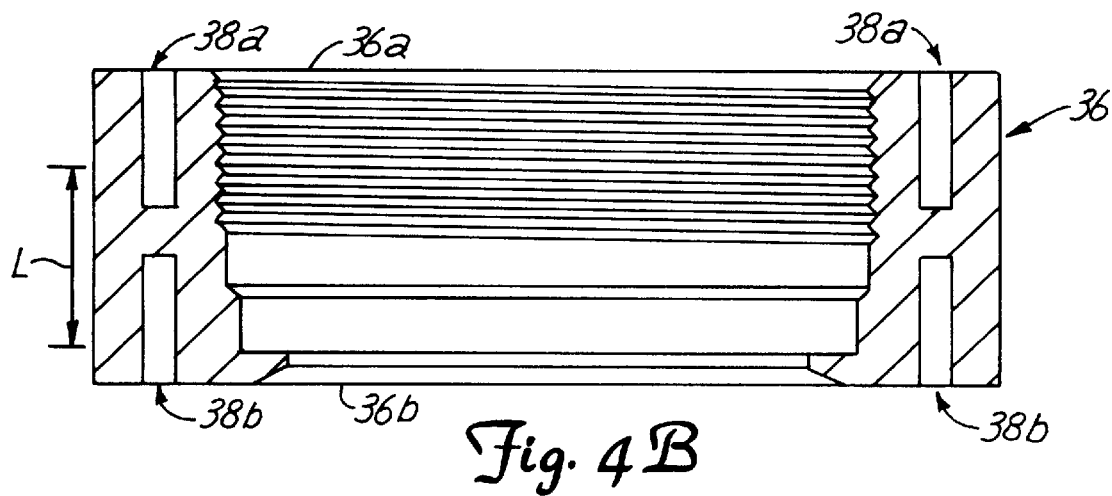
Figure 4C:
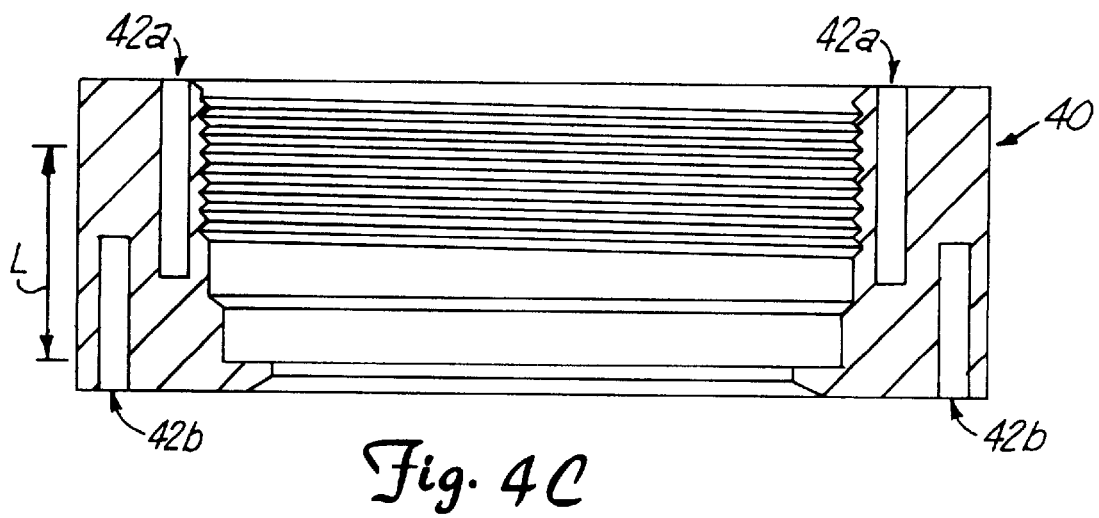
Figure 4D:
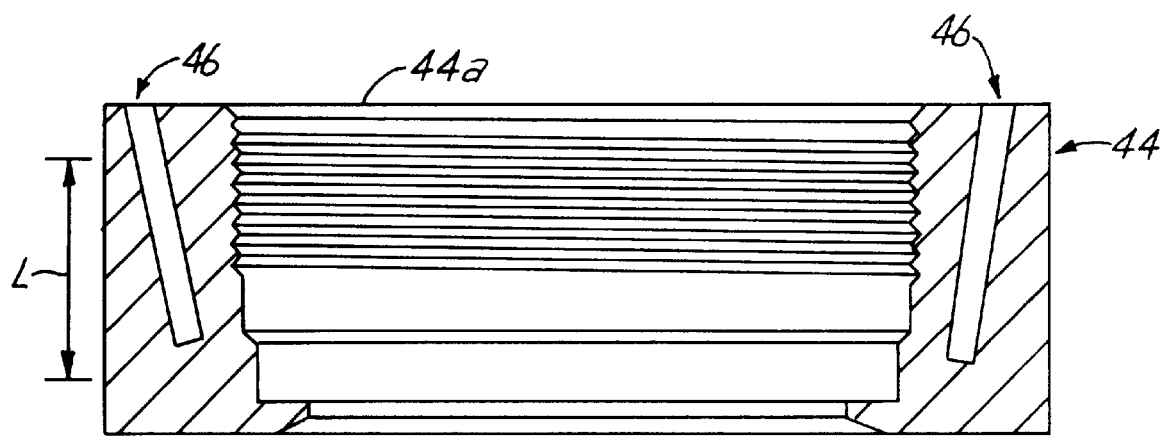

FIGS. 4a–4d show alternative embodiment process instrument mounts. The mount 32 of FIG. 4a is similar to mount 22 except that mount 32 has a groove 34 cut from a bottom end 32a rather than a top end 32b of mount 32. This prevents debris from the process instrument side of the mount from collecting inside the groove. However, process fluid may undesirably collect and stagnate inside the groove. Mount 36 in FIG. 4b has opposed aligned grooves 38a,38b cut into ends 36a,36b respectively of mount 36. In mount 36 debris can collect from both the process instrument side and the process fluid side of the mount. However, the required depth of grooves 38a,38b is less than that required for mounts 22,32, thereby permitting narrower cutting tools to be used and thus reducing the overall width of mount 36 relative to mounts 22,32. In FIG. 4c a mount 40 is shown similar to mount 36 except the grooves 42a,42b are somewhat deeper than those of FIG. 4b and are not aligned. Grooves 42a,42b overlap along a central portion of the mount to provide more stress isolation. The mount 44 of FIG. 4d demonstrates that the groove 46 need not be perpendicular to an end 44a of the mount to achieve the desired isolation. However, a groove that is perpendicular to such end can achieve maximum compactness of the mount.

Figure 5:
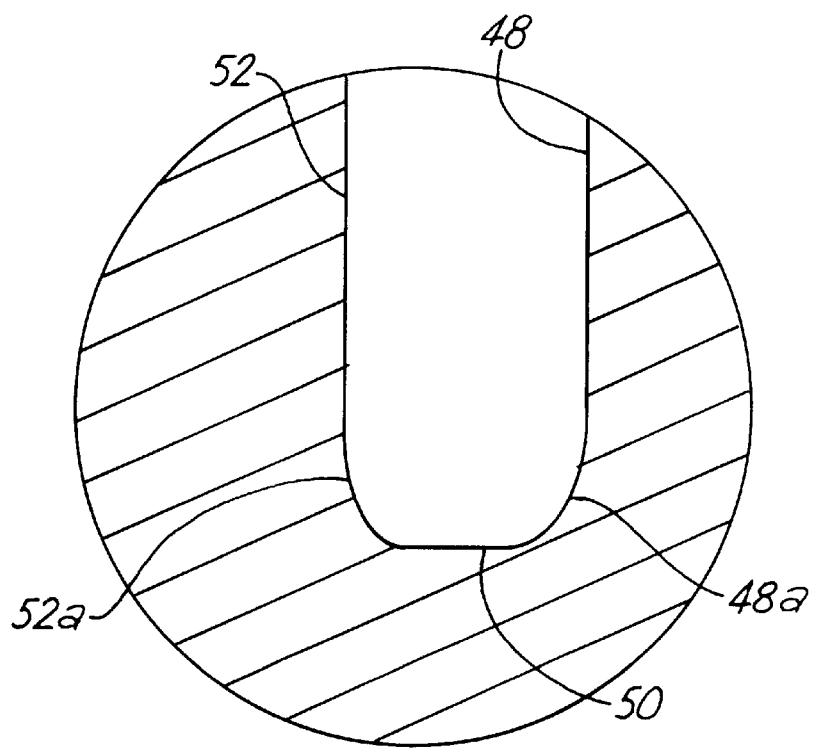
FIG. 5 shows an enlarged cross-sectional view of a preferred groove terminus.

Turning now to FIG. 5, a preferred sectional profile for the terminus of the grooves shown in FIGS. 3 and 4a–4d is shown. In particular, an outer diameter or surface 48 of the groove preferably transitions smoothly to the groove bottom 50 in a tapered or curved fashion at portion 48a. The inner diameter or surface 52 likewise transitions to the bottom 50 at a portion 52a. The use of such a curved profile helps reduce stress concentration at the groove terminus or bottom 50, thereby reducing metal fatigue. Preferably, portions 48a and 52a each have a single radius equal to half the groove width. Smaller radii with a flat bottom 50 are also possible. Such profiles can be formed using standard grooving tools.

Figure 6A:
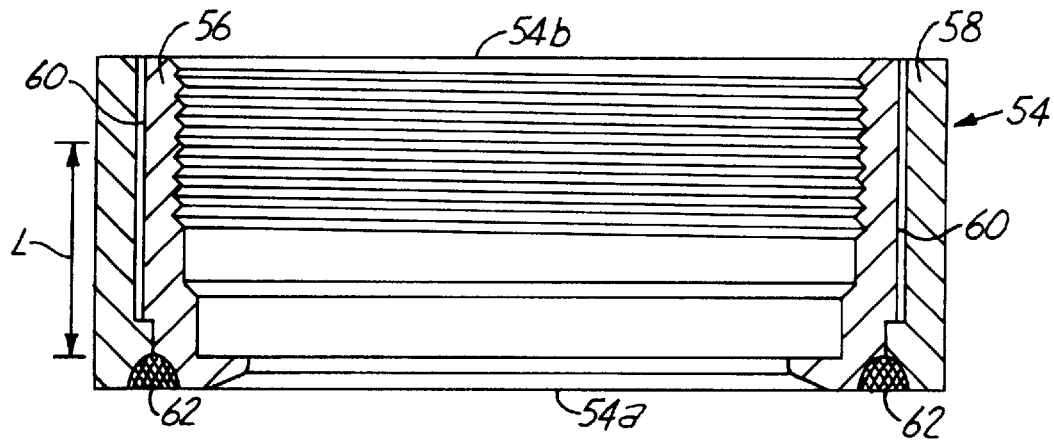
FIGS. 6a–6c show alternative mounts, generally of two-piece design, according to another aspect of the invention.

According to another aspect of the invention, the mount is constructed from two (or more) separate components that are welded or otherwise bonded together to form the mount. Mount 54 of FIG. 6a demonstrates a two piece design. An inner wall 56 mates with an outer wall 58 at a base 54a of mount 54. Walls 56,58 are shaped however in such a way as to be spaced apart from each other along the weld length L and continuing to the top 54b of the mount. The space 60 can thus be made as narrow as desired in order to reduce the mount width, and such narrow space 60 still provides the desired stress isolation. Although fabrication costs will generally be higher for mount 54 compared to the mount of FIG. 3, mount 54 can be designed to have a mount width substantially the same as prior art mount 10, and can thus be used in smaller diameter (higher curvature) process containers. A weld joint 62 connects walls 56,58. In one embodiment space 60 has a width of about 0.010 to 0.015 inches (0.25–0.38 mm).

Figure 6B:
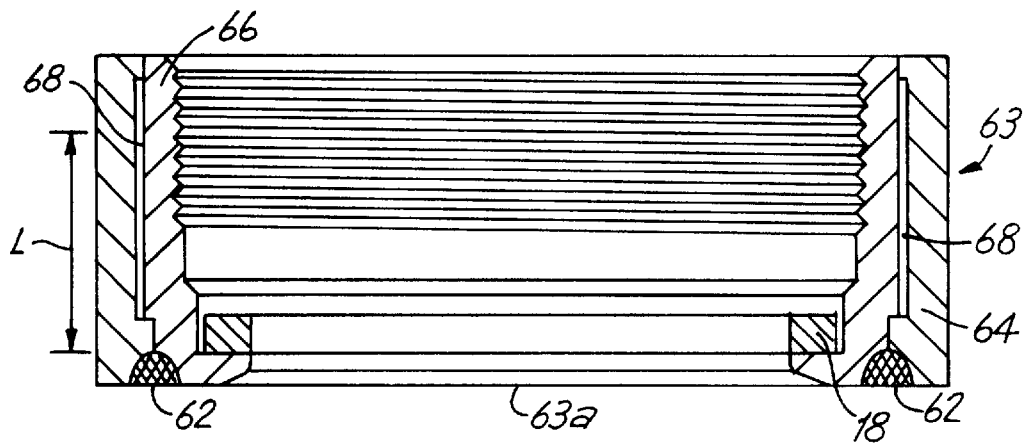

The mount 63 of FIG. 6b is similar to mount 54, except that outer wall 64 contacts the inner wall 66 at transmitter end 63a, forming a closed cavity 68 between the walls. Such arrangement stops or slows the collection of debris in the stress-isolating space. The gasket 18 of the prior art (not to scale) is shown superimposed onto the flange of the inner wall.

Figure 6C:
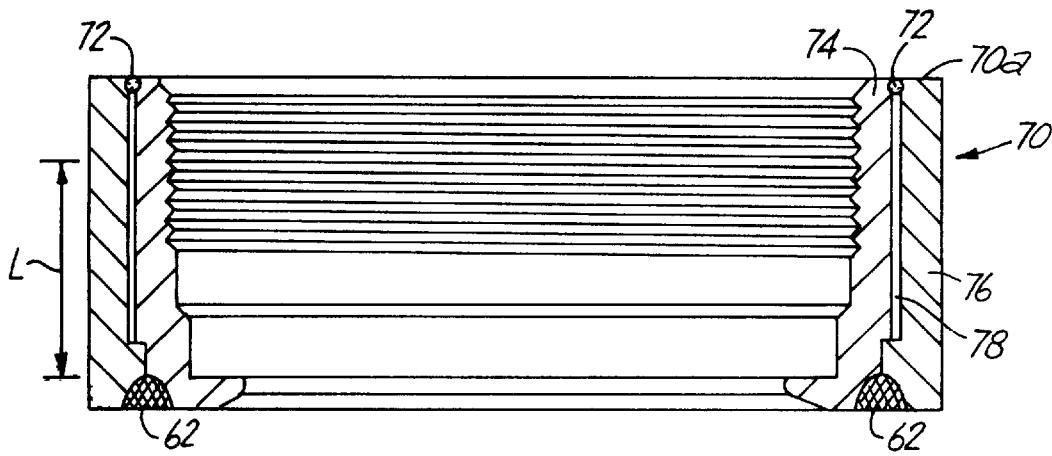

Mount 70 of FIG. 6c is similar to mount 63 except that an annular tack weld 72 joins inner wall 74 to outer wall 76 at mount end 70a, thereby sealing off an inner cavity 78.

Figure 7:
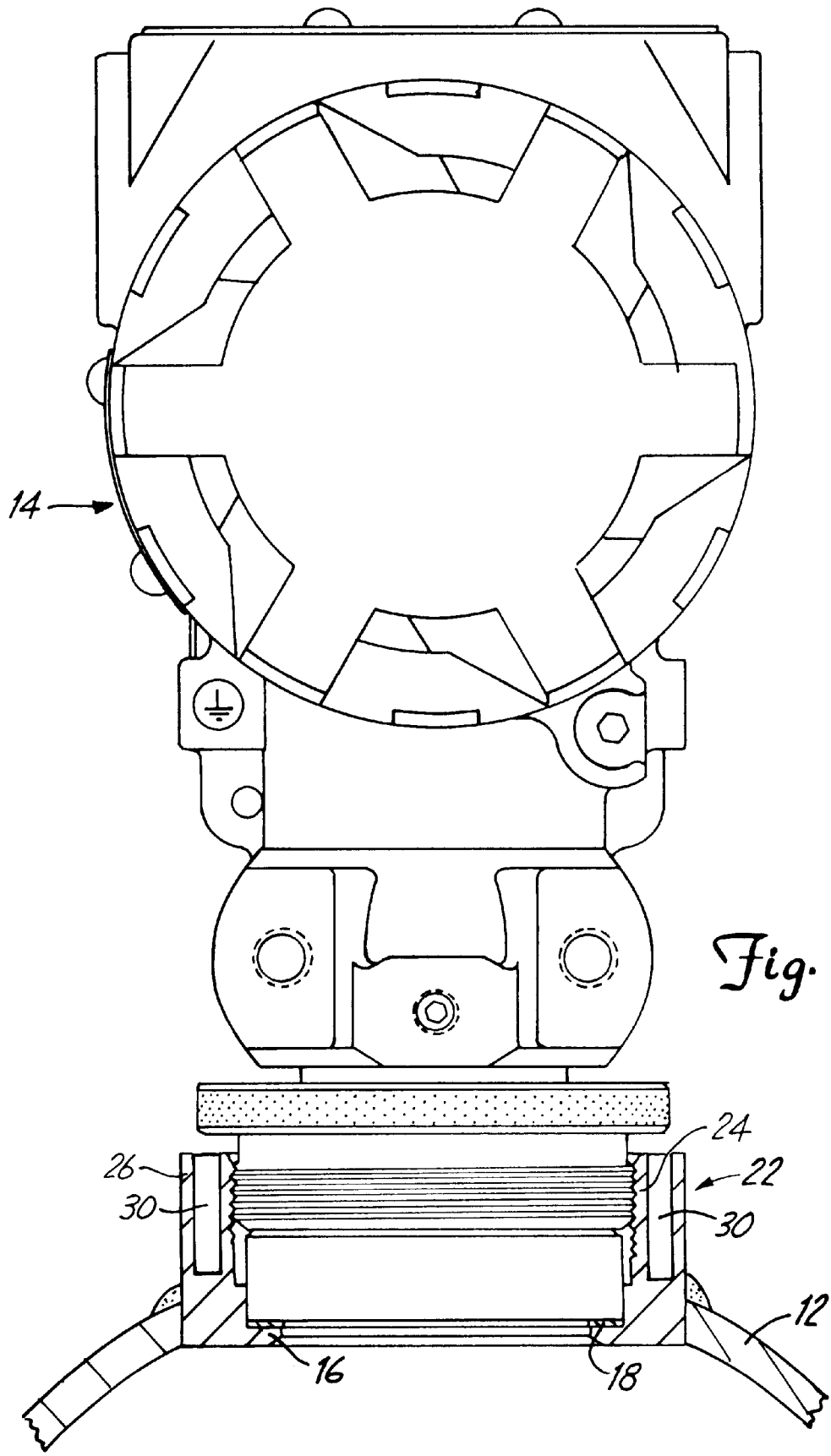
In FIG. 7 a preferred mount is shown installed on a process container together with a pressure transmitter.

In FIG. 7 the mount 22 is shown in cross-section installed in process container 12 along with the transmitter 14 and gasket 18. Mount 22 preferably comprises 316L stainless steel, the same material used in many pipes and tanks 12, for ease of welding. Other suitable materials such as those used for process piping or vessels can also be used, e.g. low carbon steels, Hastelloy brand alloy, and nickel-copper alloys.

Although the present invention has been described with reference to preferred embodiments, workers skilled in the art will recognize that changes can be made in form and detail without departing from the spirit and scope of the invention.

What is claimed is:

1. A process instrument mount, comprising:
   an outer wall having an exposed outer surface for connection to an operating environment;
   an inner wall;
   a process instrument cavity enclosed by the inner wall including;
      an opening sized for insertion of a process instrument;
      an engaging surface, opened to the opening and formed along a portion of a surface of the inner wall and operable with an engaging surface of the process instrument to removably support the process instrument; and
   the inner wall being partially coupled to the outer wall and the inner and outer wall being spaced along a portion of the engaging surface to stress isolate the inner wall from the outer wall.

2. The mount of claim 1, wherein the mount has a first end and a second end, and the process instrument cavity extends between the first end and the second end, and wherein the engaging surface of the inner wall includes threads operable with threads on the process instrument.

3. The mount of claim 2 wherein the inner wall has a flange proximate to the second end to sealingly mate with the process instrument.

4. The mount of claim 2, wherein the mount has a unitary construction and wherein the space comprises a groove formed in the mount.

5. The mount of claim 4, wherein the groove is aligned perpendicular to the first end.

6. The mount of claim 4, wherein the groove opens to the first end.

7. The mount of claim 6, wherein the groove has a groove terminus with a curved transition region.

8. The mount of claim 2, wherein the inner wall is separate from the outer wall and coupled thereto by a weld joint.

9. The mount of claim 8, wherein the weld joint is disposed at the second end.

10. The mount of claim 9, wherein the inner wall has a flange proximate the second end to sealingly mate with the process instrument.

11. The mount of claim 9, wherein the space is annular and opens to the first end.

12. The mount of claim 11, wherein the space has a width of about 0.010 to 0.015 inches.

13. The mount of claim 2 wherein the opening sized to receive the process instrument is at the first end and the second end is opened to the process instrument cavity.

14. A mount for welding onto a process container, comprising:

an outer wall having an exposed outer surface weldable to the process container;

an inner wall coupled to the outer wall;

a cavity enclosed by the inner wall having an opening sized for insertion of a process instrument;

the inner wall including an inner threaded surface to receive a process instrument; and the outer wall being at least partially spaced apart from the inner wall.

15. The mount of claim 14, wherein the mount has a one-piece structure, with a groove between the outer wall and inner wall.

16. The mount of claim 14, wherein the inner threaded wall partially couples to the outer wall by a weld joint.

17. A mount for welding onto a process container, comprising:

an outer welding ring having an exposed outer surface for connection to the process container;

an inner threaded ring enclosing an instrument cavity sized to support a process instrument, the inner ring having a threaded inner surface operable with a threaded surface of the process instrument; and the inner threaded ring partially coupled to the outer welding ring so as to form a space between the outer welding ring and the inner threaded ring to stress isolate the inner threaded ring from the outer welding ring.

18. The mount of claim 17, wherein the mount has a one-piece structure, with a groove between the outer welding ring and the inner threaded ring.

19. The mount of claim 17, wherein the inner threaded ring partially couples to the outer welding ring by a weld joint.

* * * * *